July 17, 1956

M. H. SCHMITT 2,755,393

AUTOMOBILE BATTERY PROTECTOR

Filed July 14, 1954

Marvin H. Schmitt
INVENTOR.

July 17, 1956   M. H. SCHMITT   2,755,393
AUTOMOBILE BATTERY PROTECTOR
Filed July 14, 1954   2 Sheets-Sheet 2

Marvin H. Schmitt
INVENTOR.

United States Patent Office 2,755,393
Patented July 17, 1956

2,755,393
AUTOMOBILE BATTERY PROTECTOR

Marvin H. Schmitt, Warsaw, Ill.

Application July 14, 1954, Serial No. 443,199

4 Claims. (Cl. 307—10)

This invention relates to a device adapted to be associated with the electrical distribution system of an automotive vehicle, and more particularly to apparatus for automatically disconnecting the battery of an automobile from its power consuming load when the operator of a vehicle parks and leaves his vehicle.

The primary object of the present invention resides in the provision of means of eliminating the possibility of drain on a battery if current consuming devices and attachments of the vehicle are inadvertently left connected after the operator has opened the doors to his vehicle and left the vehicle.

The construction of this invention features an apparatus which is adapted to be mounted in a vehicle so that when the operator of a vehicle opens either of the doors adjacent the driver's seat to leave the vehicle, the operative electrical circuits from the battery to the load are opened. However, when the motor of the vehicle is turning over and thus causing the generator to charge, the opening of the doors will not serve to disconnect the battery from its load.

Still further objects and features of this invention reside in the provision of an automobile battery protecting apparatus that is simple to install in various existing makes and models of automotive vehicles, which is highly effective and automatic in operation, thereby serving to extend the life of a battery, and which is inexpensive to produce, thereby permitting wide distribution and utilization.

These, together with the various ancillary objects and features of the invention which will become apparent as the following description proceeds, are attained by this automobile battery protector, preferred embodiments of which have been illustrated schematically in the accompanying drawings, by way of example only, wherein.

Figure 1:
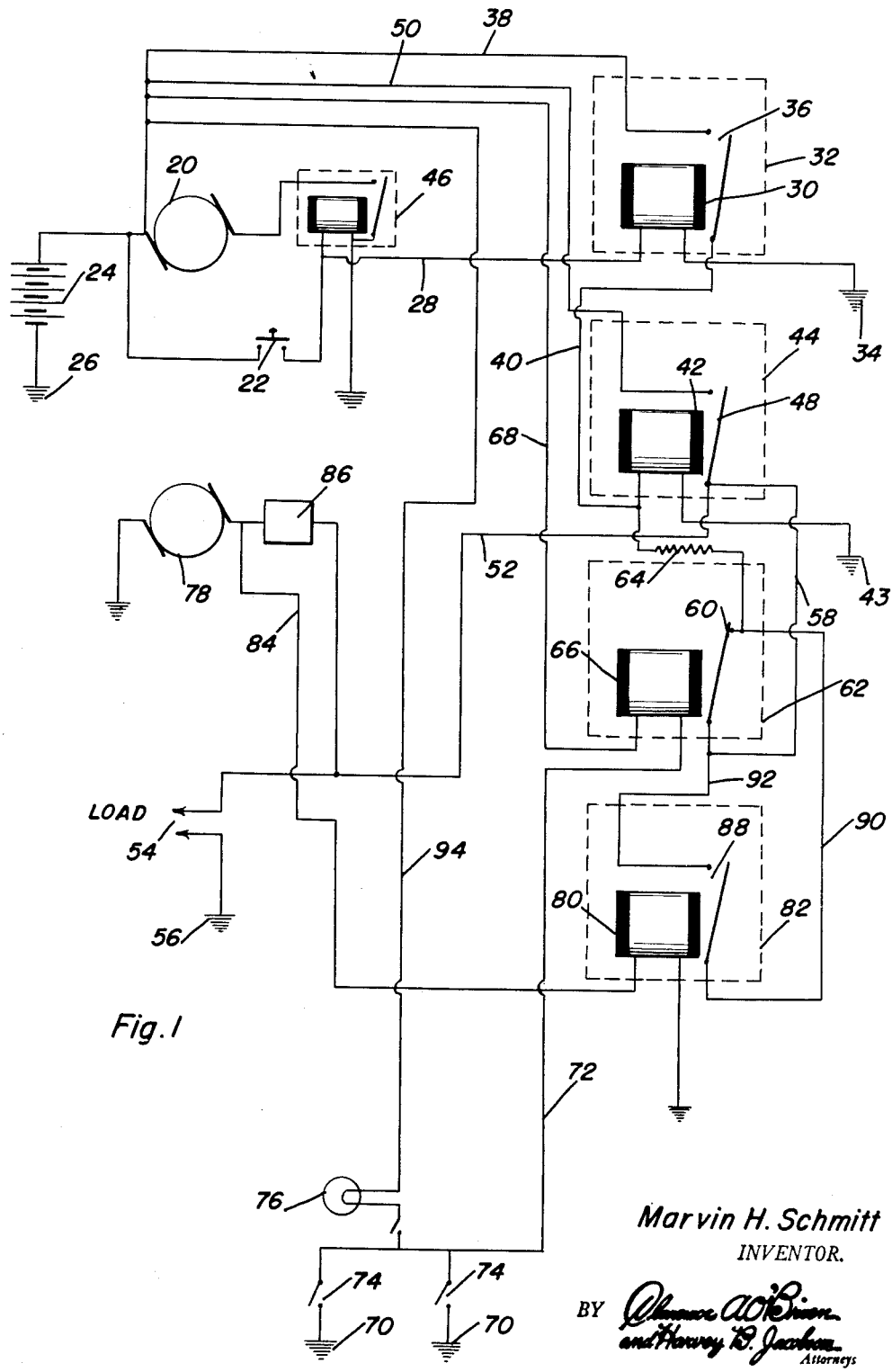
Figure 1 is a circuit diagram of one form of the automobile battery protector employing a plurality of relays operatively connected to the ignition and starting system of the vehicle.

With continuing reference to the accompanying drawings wherein like reference numerals designate similar parts throughout the various views, and with particular attention to Figure 1 in which there is shown a first embodiment of the invention, it will be noted that the starter 20 is provided with a conventional switch 22 for completing an operative electrical circuit from the battery 24 which is grounded, as at 26, to the starter 20. When the switch 22 is depressed, current is delivered through conductor 28 to the coil 30 of relay 32 which is connected to ground, as at 34. When the contacts 36 are closed, current then passes through conductor 38 from the battery 24 and through conductor 40 to the coil 42 of relay 44. Of course when the starter switch 22 is closed, the starter relay 46 is actuated.

When a circuit from the battery 24 to the coil 42 is completed, the contacts 48 will be closed, completing an operative electrical circuit through conductor 50 and contacts 48, and thence, through conductor 52 to the load, as at 54, which is, of course, grounded, as at 56.

A holding circuit is thus created from contacts 48 through conductor 58, through the normally closed contacts 60 of relay 62, through resistor 64 to the coil 42 of relay 44. The resistance 64 is provided so as to prevent large current surges through contacts 36 while contacts 48 are closing, especially when a sizable load has been left connected.

The battery 24 is thus connected to the load 54 through the large current carrying capacity contacts 48 and will remain connected until either of the driver's seat doors have been opened with the motor stopped. At that time, the coil 66 of relay 62 will then be energized by current from the battery 24 through conductor 68 which passes to ground, as at 70, through conductor 72. The current passes through conductor 72 to ground 70 through the ceiling lamp door contact terminals 74. The lamp of the ceiling light is indicated at 76.

Actuation of the relay 62 by excitation of the coil 66 opens the contacts 60 and thus disconnects the battery 24 from the load 54 by de-energizing relay 44 and thereby opening contacts 48.

When the motor is running and the generator 78 is delivering power, the coil 80 of relay 82 will be energized through conductor 84 connected on the generator side of the voltage cut-out 86. This closes the contacts 88 of the relay 82 to short circuit the contacts 60 through conductors 90 and 92. The holding circuit energizing relay 44 is thus maintained should a driver's seat door be opened while the motor is in operation and the generator is delivering power. This maintains the load 54 and the generator 78 in connection with the battery 24.

These latter interconnections are highly desirable, since the generator thus cannot deliver too great a voltage when a door is open and the battery 24 is disconnected, which could happen if the relay 82 did not effect the short circuiting of contact 60. Likewise, the connection between the load 54 and the battery 24 is maintained should idling of the internal combustion engine release the generator 78 from the load 54, since contacts 88 will be closed even when a small voltage is applied, whereas the generator cut-out 86 is designed to close when the generator voltage equals the battery voltage.

The ceiling dome light 76 is connected to the battery 24 through conductor 94 in order to permit the ceiling light to operate effectively when the doors are open while the battery 24 is disconnected from the load 54. Additionally, this connection is also necessary since if the ceiling light draws current through conductor 52 by any such connection when the relay contacts 48 are open, there would be an operative electrical circuit from the battery 24 through the conductor 68 through coil 66, through conductor 72 and thence, through the lamp 76 through conductor 52 and through conductor 58 through contact 60 and resistance 64 through coil 42 of relay 44 to ground 43, which, of course, would complete a circuit for battery drain and would cause undesirable actions in relays 62 and 44, the exact nature depending on their relative designs.

Figure 2:
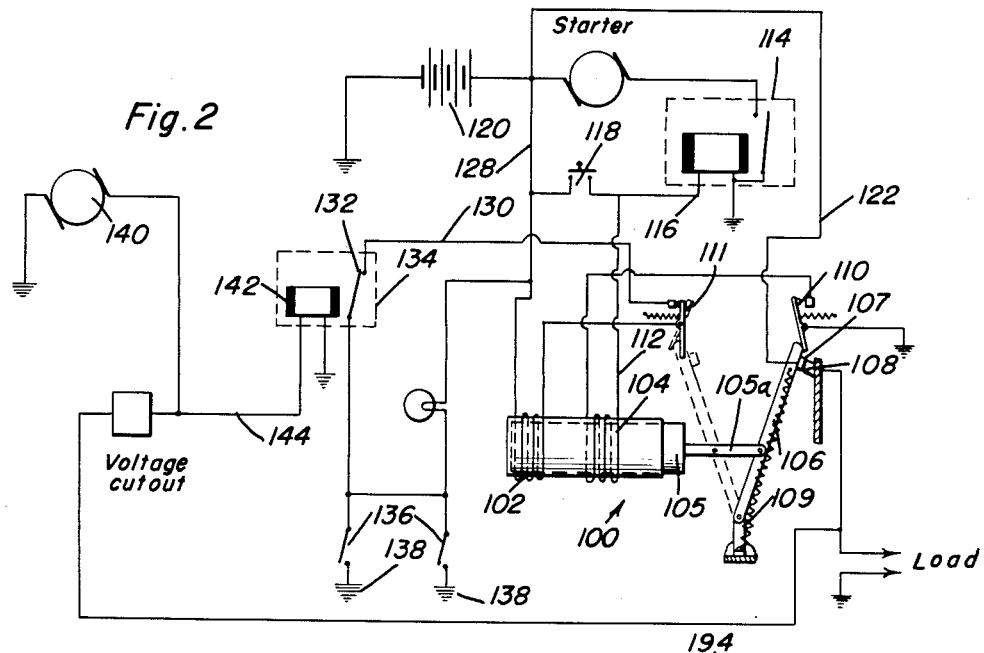
Figure 2 is a circuit diagram of a modified form of the invention employing a solenoid actuated switch having a pair of opposed coils.

Referring now to the embodiment of the invention as is shown in Figure 2, which is capable of performing similar functions to the circuitry shown in Figure 1, it will be noted that herein there is provided a solenoid switch 100 having coils 102 and 104 therein controlling core 105 having a link 105a attached thereto which is attached to a movable switch member 106 having a movable contact 107 mounted thereon. The contact 107 cooperates with and engages a fixed contact 108. A spring 109 is provided to urge the switch member to a position wherein contact 107 will engage contact 108.

Current is delivered to coil 104 through conductor 112 from the starter relay 114 at the terminal 116 thereof when the starter switch 118 is closed. This will cause the switch contacts 107 and 108 to close because core 105 will urge arm 106 to move, causing current to flow from the battery 120 through conductor 122, and thence, through conductor 124 to the load 126. With the closing of the switch contacts 107 and 108, the switch 110 opens, thereby de-energizing coil 104. The switch 110 is actuated by movable switch member 106 which also engages and actuates switch 111. The battery is now connected to the load 126 and will remain so until the following action takes place.

When either of the driver's seat doors are opened after the motor has been stopped, the coil 102 is energized by current from the battery 120 passing through conductor 128, through coil 102, through conductor 130, and through the normally closed contacts 132 of relay 134, through one of the door switches 136 which is closed, due to its door having been opened, to ground at 138. This causes the core 105 to move to open the switch contacts 107 and 108 disconnecting the battery 120 from the load 126. At this point, switch 111 opens, thereby de-energizing coil 102. The battery 120 is now disconnected and will remain so until the starter button 118 is again pressed to repeat operation.

If the driver's seat door is open while the motor is running and generator 140 is delivering power, the relay coil 142 of relay 134 is energized through conductor 144, thus opening the contacts 132 and preventing the solenoid coil 102 from being energized. This prevents the battery 120 from being disconnected from the load 126 and from the generator 140 while the motor is running.

Figure 3:
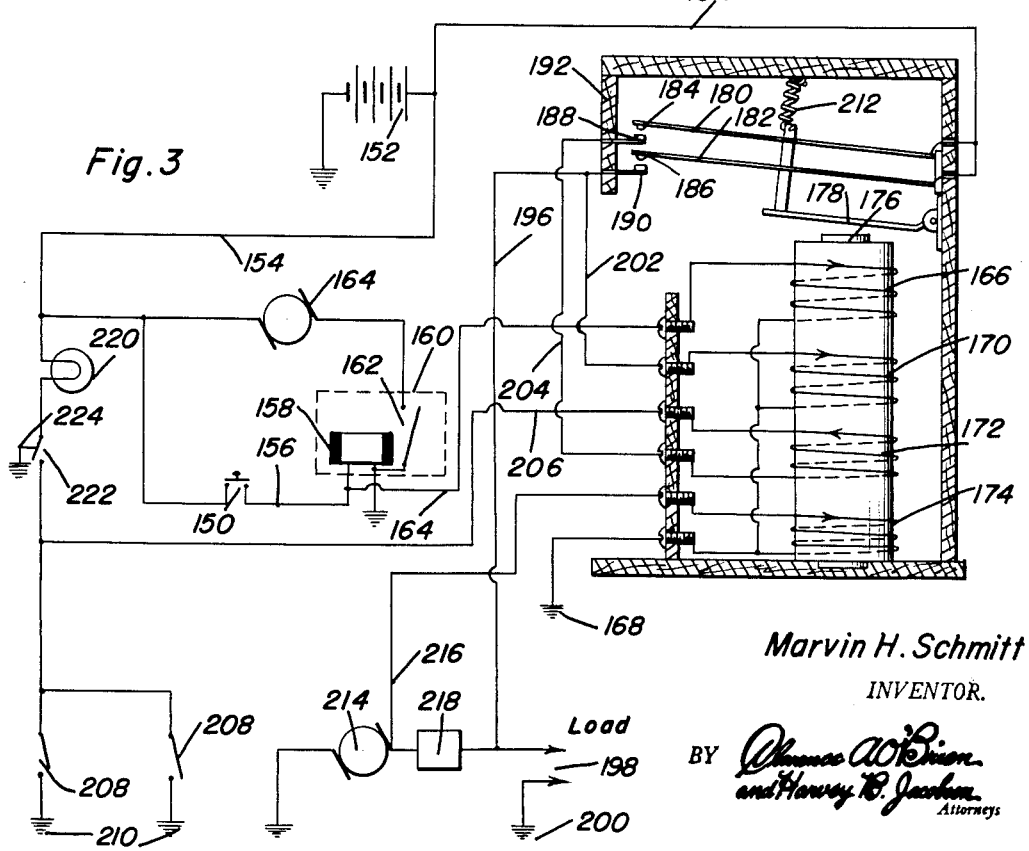
Figure 3 is a circuit diagram of a further modification of the invention employing a single armature core separately excited by a plurality of coils suitably interconnected with the starting and ignition system of the vehicle.

Referring now to the embodiment of the invention as shown schematically in Figure 3, it will be noted that in this form of the invention, when the starter switch 150 is closed, electrical energy will flow from the battery 152 through conductor 154 as well as conductor 156 to the coil 158 of the starter relay 160 to close the starter relay contacts 162 to thus complete an operative electrical circuit to the starter motor 164. At the same time, an operative electrical circuit will be completed from the battery 152 through conductors 154 and 156 and thence through conductor 164 to a first coil 166 to ground 168. The coil 166, as well as coils 170, 172 and 174 provide magnetic fields for actuating armature 176. Each of the coils 166, 170, 172 and 174 are separately wound and separately excited, as will be henceforth explained.

The excitation of coil 166 will cause the relay arm 178 carrying movable contact arms 180 and 182 on which movable contacts 184 and 186 are affixed to move into engagement with stationary contacts 188 and 190. The stationary contacts 188 and 190 may be carried by any suitable support, as at 192.

The closing of the contacts 186 and 190 will complete an operative electrical circuit from the battery 152 through conductor 194 as well as conductor 196 to the load 198 which may be grounded as at 200, at the same instant a relay holding circuit is completed from the contacts 186 and 190 through conductor 202, and through the relay coil 170 to ground 168.

The battery 152 is now connected to the load 198 and will so remain until either of the driver's seat doors is opened after the ignition has been cut off. When either of the driver's seat doors is opened and the ignition cut off, a circuit will be completed from the battery 152 through lead or conductor 194 to the contacts 184 and 188 and thence through conductor 204 to relay coil 172 and conductor 206 through the door switches 208 to ground 210. This energizes relay coil 172 which creates a magnetic flux of reverse polarity relative to the polarity of the holding circuit coil 170, thereby cancelling magnetic flux in the relay core 176 and allowing the relay arm 178 which is spring held, as at 212, to open the contacts 184 and 186 from contacts 188 and 190, thereby disconnecting the battery 152 from the load 198 and from the cancelling coil 172.

The battery will now remain disconnected until the starter switch 150 is again actuated.

In order to make possible the discharging or taking on of passengers while the vehicle is in operation with the internal combustion engine operating and the generator 214 charging, the relay coil 174 is provided. When the generator is charging, a circuit is energized from the generator 214 through conductor 216 connected between the generator cut-out 218 and the generator 214 to the relay coil 174 and thence to ground 168. As long as the relay coil 174 is energized, relay arm 178 will continue to hold the switches formed by contacts 184 and 186 and contacts 188 and 190 closed, even should the opening of a driver's seat door cause relay coils 170 and 172 to cancel each other.

In order to make possible the normal operation of the interior dome light 220 of the vehicle when a door is opened to enter the car at which time the battery 152 is disconnected from the load 198, a connection is made directly from the battery 152 to the dome light through conductor 154. The dome light switch 222 is so constructed that the dome light 220 is normally connected through the door switches 208. When the dome light switch 222 is turned on to light the dome light while the doors are closed, the switch breaks contact and completes the circuit to the ground, as at 224. This prevents the energization of the relay coil 172 and disconnecting the battery 152.

It is to be recognized that various other expedients for mounting the dome light 220 may be readily resorted to in order to obtain proper function of the dome light in any of the forms of the invention.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An automobile battery protector for disconnecting the battery of an automobile from power consuming load devices upon actuation of a door controlled switch, comprising a first relay means connected to said battery for exciting a holding circuit relay means, said holding circuit relay means forming a holding circuit interconnecting said battery to power consuming load devices, and other relay means for disrupting said holding circuit, said other relay means being operative to disrupt said holding circuit upon actuation of a door controlled switch, and a separately excited relay means for retaining an operative electrical circuit between said battery and said power consuming load devices when said separately excited relay means receives current from a source of electrical power separate from said battery.

2. An automobile battery protector for disconnecting the battery of an automobile from power consuming load devices upon actuation of a door controlled switch, comprising a first relay means connected to said battery for exciting a holding circuit relay means, said holding circuit relay means forming a holding circuit interconnecting said battery to power consuming load devices, and other relay means for disrupting said holding circuit, said other relay means being operative to disrupt said holding circuit upon actuation of a door controlled switch, and a separately excited relay means for retaining an operative electrical circuit between said battery and said power consuming load devices when said separately excited relay means receives current from a source of electrical power separate from said battery, said first relay means, said holding circuit relay means, said other relay means and said separately excited relay means including a single core and a plurality of separately wound coils, each of said coils being wound on said core.

3. An automobile battery protector for disconnecting the battery of an automobile from power consuming load devices upon actuation of a door controlled switch, comprising an electrical means connected to said battery for inducing a circuit holding means, said circuit holding means forming a circuit holding interconnecting said battery to power consuming load devices, and other electrical means for disrupting said circuit holding, said other electrical means being operative to disrupt said circuit holding upon actuation of a door controlled switch, and a separately excited relay means for retaining an operative electrical circuit between said battery and said power consuming load devices when said separately excited relay receives current from a source of electrical power separate from said battery, said electrical means, said circuit holding means and said other electrical means including a single frame and a plurality of separately actuated means and said separately excited relay including a single coil and core.

4. An automobile battery protector for disconnecting the battery of an automobile from power consuming load devices upon actuation of a door controlled switch, comprising a first relay means connected to said battery for exciting a holding circuit relay means, said holding circuit relay means forming a holding circuit interconnecting said battery to power consuming load devices, and other relay means for disrupting said holding circuit, said other relay means being operative to disrupt said holding circuit upon actuation of a door controlled switch, and a separately excited relay means for retaining an operative electrical circuit between said battery and said power consuming load devices when said separately excited relay receives current from a source of electrical power separate from said battery, said first relay means, said holding circuit relay means, said other relay means and said separately excited relay means including several cores and a plurality of separately wound coils, each of said coils being wound on one or the other of said several cores.

References Cited in the file of this patent

UNITED STATES PATENTS 2,515,044   Kappel _____ July 11, 1950